(12) United States Patent
Razeto

(10) Patent No.: US 7,840,051 B2
(45) Date of Patent: Nov. 23, 2010

(54) MEDICAL IMAGE SEGMENTATION

(75) Inventor: Marco Razeto, Edinburgh (GB)

(73) Assignee: Toshiba Medical Visualization Systems Europe, Limited, Edinburgh (GB)

( * ) Notice: Subject to any disclaimer, the term of this patent is extended or adjusted under 35 U.S.C. 154(b) by 1008 days.

(21) Appl. No.: 11/562,701

(22) Filed: Nov. 22, 2006

(65) Prior Publication Data

US 2008/0117209 A1    May 22, 2008

(51) Int. Cl.
*G06K 9/00* (2006.01)
(52) U.S. Cl. ........................ 382/131; 382/173
(58) Field of Classification Search .......... 382/128, 382/131, 154, 173
See application file for complete search history.

(56) References Cited

U.S. PATENT DOCUMENTS

| | | | | |
|---|---|---|---|---|
| 5,782,762 | A | 7/1998 | Vining | 600/407 |
| 6,067,366 | A | 5/2000 | Simanovsky et al. | 382/100 |
| 6,075,871 | A | 6/2000 | Simanovsky et al. | 382/100 |
| 6,083,162 | A | 7/2000 | Vining | 600/407 |
| 2002/0045153 | A1 | 4/2002 | Kaufman et al. | 434/262 |
| 2003/0223627 | A1* | 12/2003 | Yoshida et al. | 382/128 |
| 2005/0031202 | A1 | 2/2005 | Accomazzi et al. | 382/173 |
| 2005/0113679 | A1 | 5/2005 | Suryanarayanan et al. | 600/425 |
| 2005/0117787 | A1 | 6/2005 | Iordanescu et al. | 382/128 |

FOREIGN PATENT DOCUMENTS

| | | | |
|---|---|---|---|
| WO | WO 03/058553 A2 | 7/2003 | |
| WO | WO 2005/036457 A2 | 4/2005 | |
| WO | WO 2006/086467 A1 | 8/2006 | |

OTHER PUBLICATIONS

C.L. Wyatt et al.; "Automatic Segmentation of the Colon for Virtual Colonoscopy;" 2000; pp. 1-9, Computerized Medical Imaging and Graphics, vol. 24.
Hans Frimmel et al.; "Centerline-based Colon Segmentation for CT Colonography;" Aug. 2005; pp. 2665-2672, Med. Phys., vol. 23, No. 8.
T.H. Cormen et al.; Introduction to Algorithms, Second Edition, MIT Press and McGraw-Hill, ISBN 0-262-03293-7, Chapter 21: "Data Structures for Disjoint Sets;" 2001; pp. 498-524.

* cited by examiner

*Primary Examiner*—Andrew W Johns
(74) *Attorney, Agent, or Firm*—Renner, Otto, Boisselle & Sklar, LLP

(57) ABSTRACT

A method of automatically segmenting a patient's colon in a medical image data set is provided. The method comprises two main stages. The first stage is to classify voxels in the data set as not belonging to the colon based on their radiodensities and/or positions within the volume data set. In taking account of the voxels' positions in the data set, account may be taken of their positions relative to other voxels. For example, this may include determining whether voxels are within connected groups of voxels of similar characteristics, i.e. within connected regions or domains. Subsequent to the first stage of classifying voxels as not belonging to the colon, a second stage is performed in which all remaining voxels are classified as belonging to the colon. Thus the method allows for automatic segmentation of the colon without needing any particular voxel, such as a seed voxel for region growing, to first be positively identified as being within the colon.

15 Claims, 9 Drawing Sheets

MEDICAL IMAGE SEGMENTATION

BACKGROUND ART

The invention relates to the segmentation of medical images, and in particular to automatic colon segmentation.

Medical image segmentation is the process of classifying voxels in a data set according to tissue type/anatomical feature. Colon segmentation is thus fee process of identifying which voxels in a medical image data set correspond to a patient's colon.

Colorectal carcinomas are responsible for a large number of deaths. Accordingly, colorectal screening is a commonly performed procedure. The aim of colorectal screening is to provide a clinician with a view of a patient's colon so that he can identify any anomalies, e.g. colorectal polyps, which warrant further study or surgery.

One technique for colorectal screening is colonoscopy. Traditional colonoscopy involves the use of an endoscope to allow direct visual inspection of a patient's colon. The technique is relatively invasive and so can be uncomfortable for the patient, and requires relatively heavy sedation. Accordingly, an often preferred alternative is virtual colonoscopy (computer simulated colonoscopy). Virtual colonoscopy is a technique based on obtaining three-dimensional medical image data of a patient, for example using x-ray computed tomography (CT) scanning techniques. Image data are normally obtained after the patient has undergone colonic lavage and sufflattion so that the colon is clear and full of gas. The medical image data are then processed and a graphical reproduction of the sufflated colon displayed to a clinician. The clinician may then provide a diagnosis based on his analysis of the graphical reproduction. Virtual colonoscopy has the advantages of being less invasive for the patient and providing the clinician with much greater flexibility in the way he can view the virtual colon. For example, the clinician can choose to observe the virtual colon from almost any direction, from both inside and outside the colon, and can easily zoom-in and -out of any regions considered to be of particular interest.

A fundamental aspect of virtual colonoscopy is the process of identifying which voxels in the medical image data set correspond to the colon and which do not (i.e. colon segmentation). This is what allows voxels corresponding to the colonic wall to be rendered visible in images displayed to the clinician, while other "non-colon" voxels are rendered transparent.

The usual procedure for segmenting the colon is to first identify a so-called "seed" voxel within the colon lumen. The next step is to then "grow" a region around the seed voxel to identify connected voxels having similar characteristics (e.g. x-ray absorption density). The result of the growing process is thus a connected region of voxels having similar characteristics to the seed voxel. This connected region is taken to correspond to the colon. These methods for segmentation may be referred to as "seed-and-grow" methods.

There are various well known processes for growing a region around the seed voxel [1, 2]. These can be computationally intensive, but are otherwise generally relatively straightforward. However, the process of identifying an appropriate seed voxel in the first instance is not generally so simple.

A common way of identifying an appropriate seed is to provide the clinician with an overview image of the data set which is rendered in such a way that all anatomical features are apparent. The clinician is thus able to visually identify the colon in the image and identify a seed voxel within it. At this stage the clinician will also define an appropriate radiodensity threshold between the density of gas and the density of body tissue in the image data to define the boundary of the colon for the region growing procedure.

This approach is relatively reliable, but has the disadvantage of requiring clinician input. The required input can be significant because the colon will often not be apparent as a single connected region in the medical image data, e.g., because of obstructions in the colon such as peristalsis, very large legions or residual faeces. This means the clinician will often need to identify multiple seed voxels (i.e., one in each separated region of colon). In addition to being time more consuming, there is also an increase in the likelihood of an incomplete segmentation.

Schemes for automating colon segmentation procedures have therefore been proposed. Automation is generally preferable for medical image data pre-processing because it saves clinician time, both in terms of the clinician having to take part in the pre-processing itself, and also in terms of the clinician having to wait for the results of the pre-processing before continuing his analysis. Automation can also help to improve objectivity and reproducibility in the analysis because it removes a possible source of clinician subjectivity.

One previously proposed scheme for automatic colon segmentation is described by Wystt et at in "Automatic Segmentation of the Colon for Virtual Colonoscopy" [3]. Wyatt et al.'s technique is a seed-and-grow technique in which the seed voxel is determined automatically.

In a first stage of Wyatt et at's scheme, the voxels in a medical image data set which are internal to the patient and which correspond with air/gas are identified. This is done by assuming only those voxels with a radiodensity below −800 HU are air/gas. Voxels with a radiodensity above −800 HU, on the other hand, are taken to represent body tissue. Voxels comprising the air surrounding the patient are identified by a series of seed-and-grow procedures seeded by voxels at the corners of the data set. Connected regions of voxels having radiodensity below −800 HU and including one of the eight corners of the volume data set are taken to correspond with surrounding air.

In a second stage, the distance from each of the internal air/gas voxels to its nearest voxel comprising body tissue is determined. This is done by applying a 3-4-5 chamfer distance transform based on a two-pass recursive morphology operation. The internal air/gas voxel having the greatest distance from surrounding body tissue is necessarily near the centre of the largest gas/air filled volume in the patient. When distended by insufflation, the colon is generally the largest gas-filled structure in the lower abdomen. Accordingly, the internal air/gas voxel having the greatest distance from surrounding body tissue is taken as the seed voxel for the colon. The region grown from this seed is taken to correspond to the colon.

In a third stage of Wyatt et al.'s scheme, the elongation of the connected region obtained in the seed-and-grow procedure from the automatically selected seed voxel is characterised. This is done because the stomach can sometimes present the largest gas/air filled volume in the patient. However, whereas the upper-most sections of the colon are relatively elongate, the stomach, which is normally in the same portion of the volume data as the upper-most sections of the colon, is usually less so. Thus if the connected region is in the region of the volume data that would normally include the stomach and is deemed not to be sufficiently elongate, it is determined that the connected region corresponds to the stomach and not the colon. The voxels in this connected region are thus discounted from the segmentation and the second stage is repeated.

A problem with this scheme is that the seed-and-grow procedure is computation intensive. Furthermore, multiple seed-and-grow procedures are generally required, for example to properly segment an obstructed colon, and also in those cases where the stomach is identified. By way of example, Wyatt et al. report run-times on the order of one hour for the algorithm to process a single volume data set using an SGI Onyx computer with a MIPS R10000 processor.

Another previously proposed scheme for automatic colon segmentation is described by Frimmel et al. in "Centerline-based Colon Segmentation for CT Colonography" [4]. The scheme relies on calculating local centerpoints along thresholded components of abdominal air, and connecting the centerpoints iteratively to yield centerlines. Anatomy based metrics are then used to identify centerlines not associated with the colon (e.g. because the centerlines follow shapes which are not characteristic of the colon). A thick region encompassing the colonic wall is extracted by region-growing around the remaining centerline.

Like Wyatt et al.'s scheme, this process is in effect another seed-and-grow method in which appropriate seed voxels are determined automatically. In this case the seed voxels are selected by virtue of being located on a centerline determined to run through the colon based on its characteristic shape. This method is again relatively computationally intensive, typically taking on the order of tens of seconds to process a data set.

There is therefore a need for a simple, reliable and robust method and apparatus for automatic colon segmentation.

SUMMARY OF THE INVENTION

According to a first aspect of the invention there is provided a method of segmenting a colon in a medical image volume data set comprising an array of voxels having associated image intensities (signal values), the method comprising: defining a segmentation data structure for maintaining segmentation information: and classifying voxels in the segmentation data structure by performing a first step of classifying voxels as not belonging to the colon based on their associated image intensity and/or position in the data set, and performing a second step of classifying all remaining voxels as belonging to the colon, thereby automatically segmenting the colon without first requiring a voxel to be identified within it.

Thus the approach is based on identifying voxels as not corresponding to the colon and assuming all other voxels do correspond to the colon. This has the advantage of being more likely to incorrectly identify something that is not colon as colon, than it is to incorrectly identify something that is colon as not colon. This is generally considered a safer approach because it is less likely that a potentially abnormal section of colon is not included in the segmentation (and so not seen by a clinician reviewing the data). Furthermore, because the process of identifying voxels that do not belong to the colon can be relatively straightforward, i.e. based simply on their image intensity and/of position in the data set (which may include absolute position or position relative to other voxels, e.g. those in connected regions of voxels), the approach is not computationally intensive. For example, the approach has been found to be at least an order of ten or so faster than other automatic colon segmentation techniques. The approach thus provides a simple, reliable and robust method for automatic colon segmentation.

The data structure may be any conventional known data structure for maintaining segmentation, information. For example, the data structure may be based on the data set itself, wherein voxels classified as not belonging to the colon have their image intensities set to a value which causes subsequent data processing steps to recognize them as not being classified as part of the colon (e.g. so they can be rendered transparent in images). In another example, the data structure may comprise a volume mask corresponding to the volume data, wherein the volume mask contains a flag for each voxel in the volume data. The flag for each voxel can then be set according to whether the corresponding voxel is within or without the colon segmentation. Thus subsequent data processing steps can ignore voxels, or render them transparent, according to the value of the flag in the mask. In still another example, the data structure may comprise a simple listing of which voxels are classified as colon. Thus the process of classifying a voxel as not belonging to the colon involves removing it from the list. The process of classifying a voxel as belonging to the colon involves maintaining it on the list. In a similar manner, the list may be initially defines as being empty, whereby the process of classifying voxels as belonging to the colon involves adding them to the list and the process of classifying voxels as not belonging to the colon involves not adding them to the list. Various other techniques are known in the art for maintaining segmentation information and any of these could equally be used.

Performing the first step may include classifying voxels having an image intensity (for example radio-density obtained in a CT scan) greater than a threshold value as not belonging to the colon. This can be useful since in obtaining a typical volume data set for colonoscopy applications, the colon will normally have been filled with air/gas. Thus voxels in the data set corresponding, to the colon will be associated with relatively low imaging intensities. Accordingly, the non-gas voxels in the data set such as body tissue, clothing, scanner gantry/patient support table, can readily be classified as not belonging to the colon based on applying a threshold to the image. A suitable radiodensity threshold for a CT scan data set might be selected from the group consisting of −300, −400, −500, −600, −700 and −800 Hounsfield Units, for example.

In some embodiments, the first step may include classifying voxels with a position within a connected region of voxels that is contained wholly within a pre-determined sub-portion of the data set as not belonging to the colon. This can be useful for identifying features in the volume data set that are known not to be associated with the patient's colon, and which typically occur in a known part of the data set. For example, the sections of the scanner gantry/support table for the patient or hollow (i.e. gas-filled) structures within them, can be identified in this way. For example, the sub-portion may comprise a region of the data set extending away from the posterior coronal boundary of the data set since this region will typically be to the side of a patient lying on his back which includes the table. Other sub-portions may be defined for patients lying in different orientations. Furthermore, the sub-portion may comprises a fraction selected from the group consisting of 10%, 15%, 20%, 25%, 30%, 35%, 40%, 45% and 50% of the voxels in the medical image data. Such a region size will generally include the table structure for a typical scan configuration.

The first step, may include classifying voxels in connected regions which intersect with the sagittal and coronal boundaries of the data set as not belonging to the colon. This can help to identify air surrounding the patient during the scan (i.e. external air).

The first step may include selecting first and second transverse planes in the volume data set, and classifying voxels in .connected regions which intersect with the first transverse plane, but not with the second transverse plane, as not belonging to the colon. This can be useful in identifying anatomical features which are typically confined to a known region of the data set (i.e. a region which includes the first transverse plane, but not the second, for example a patient's lungs).

The first step may include classifying voxels in connected regions having a volume less than a threshold number of voxels as not belonging to the colon. This is useful in removing artifacts such as those associated with air pockets in the patient's clothes or body. For a typical scan resolution, the threshold number of voxels may for example be from a few tens, e.g. around 20 or 30, to a few hundred, e.g. around 200 or 300 voxels. For example a number of voxels selected from the group consisting of 50, 100, 150, 200, 250 and 300 may be used.

The method may comprise a further step of further processing the segmented colon. For example this may include rendering and displaying an image to a user which represents the results of the segmentation, or processing the data set in another way to take account of tire colon, e.g. to determine its volume or morphological properties.

According to another aspect of the invention there is provided a computer program product comprising machine readable instructions for implementing the method of the first aspect of the invention.

The computer program product may comprise a computer program on a carrier medium, for example a storage medium or a transmissions medium.

According to another aspect of the invention there is provided a computer configured to perform the method of the first aspect of the invention.

According to another aspect of the invention, there is provided an apparatus for segmenting a colon in a medical image data set comprising an array of voxels having associated signal values (image intensities), the apparatus comprising: a processing unit coupled to a source of medical image data, wherein the processing unit is operable to load a medical image data set from the source of medical image data, to define a segmentation data structure for maintaining segmentation information; and to classify voxels in the segmentation data structure by performing a first step of classifying voxels as not belonging to the colon based on their associated signal value and/or position in the data set, and performing a second step of classifying all other voxels as belonging to the colon, thereby automatically segmenting the colon without first requiring a voxel to be identified within it.

According to another aspect, of the invention there is provided a method of classifying voxels in a medical image volume data set obtained by scanning a patient, the method comprising identifying a connected region of voxels having similar characteristics that occurs wholly within a pre-determined sub-portion of the data set, and classifying voxels within this connected region as not being of interest, e.g. not being associated with the patient. These voxels can then be segmented as appropriate.

Thus by applying this technique, features of a medical image scan, for example sections of the scanner gantry, support table, or voids within them, which typically occur only within a known sub-portion of the data set, and which are known not to be of interest, i.e. because they are not associated with the patient, can be readily classified as such. Furthermore this is done in a fast and simple, yet reliable and robust manner. The method may, for example, take only a fraction of a second to process a typical medical image data set when running on a conventional "desktop class" computer.

The pre-determined sub-portion may, for example, comprise a region which extends away from a boundary of the data-set on the same side of the patient as the table he is lying on. For example, for a supine patient the region may extend away from the posterior coronal boundary of the data set. For a prone patient the region may extend away from the anterior coronal boundary of the data set. For a patient lying on their side, the region may extend away from either the left or right sagittal boundary of the data set, according to whether the patient is lying on their left or right side. Information regarding the orientation of the patient on the table for a givers data set may be known in advance, for example because the data set being processed relates to a scan that it always made with the patient in the same orientation, e.g. always lying on their back. Alternatively, the orientation of the patient on the table for a given data set may be obtained from file header information associated with the data set so that the appropriate sub-portion of the data can be determined prior to identifying connected regions of voxels which occur wholly within it.

Typically the sub-portion may comprises around 20% to 30% or so, for example about 25%, of the voxels in the medical image data. Such a region size will generally include the table structure for typical scan configurations. However, other sub-portions, for example containing up to 50%, or as low as only a few percent, of the voxels, and having different, possibly non-regular, shapes could also be pre-defined in dependence on the details of the scan performed (e.g. size, orientation, equipment configuration).

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
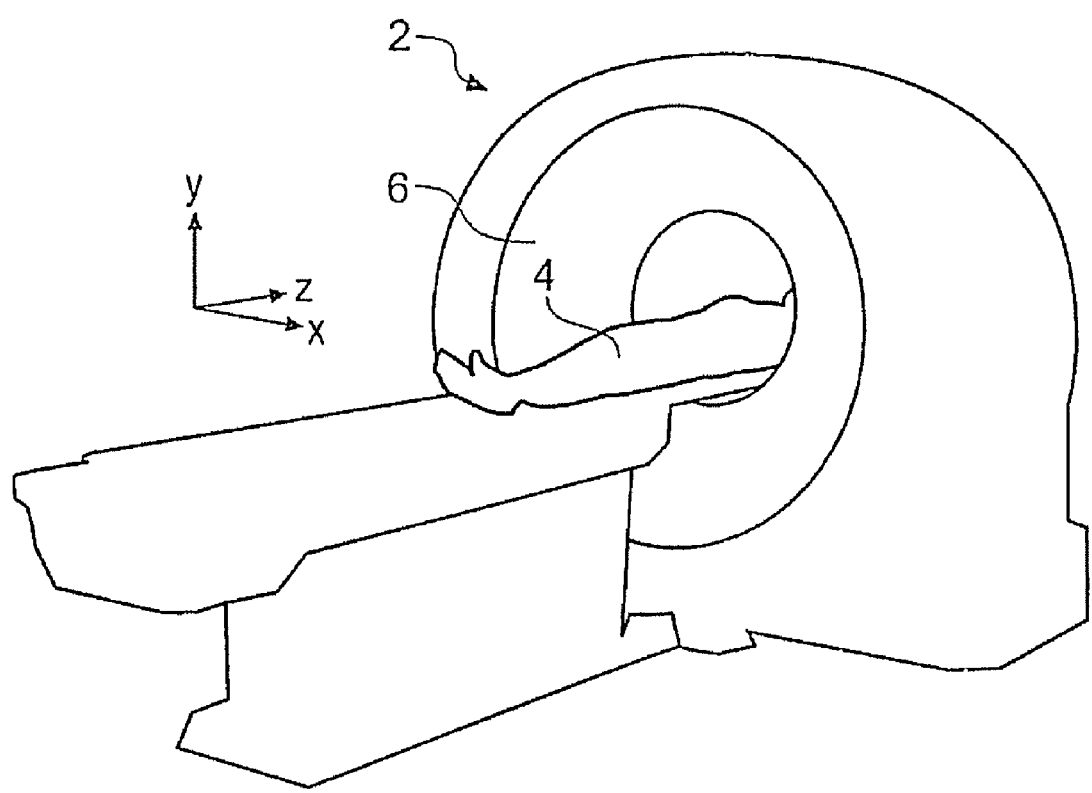
FIG. 1 schematically 1 shows a generic x-ray CT scanner for generating volume data sets for processing in accordance with embodiments of the invention.

FIG. 1 is a schematic perspective view of a generic x-ray CT scanner 2 for obtaining a three-dimensional (3-d) scan of a patient 4 to provide data suitable for virtual colonoscopy. The patient's abdominal region is placed within a circular opening 6 of the CT scanner 2 and a series of x-ray images are taken from different directions around the patient. The raw image data are combined using tomographic techniques to produce a volume data set. The volume data set comprises a collection of voxels. Conventionally, the volume data set is aligned with transverse, sagittal and coronal planes. Thus a Cartesian co-ordinate system may be defined in which the xy-axes are in a transverse plane, the xz-axes are in a coronal plane and the yz-axes are in a sagittal plane. The conventional orientations for the x, y and z-axes relative to the patient are schematically shown to the top left of FIG. 1. In this orientation the z-axis increases from the patient's feet to his head (i.e. inferior to superior), the x-axis increases from the patient's left to his right, and the y-axis increases from the patient's rear to his front (posterior to anterior). Thus transverse planes are slices of the data set arranged normally to the z-direction, sagittal planes are slices of the data set arranged normally to the x-direction, and coronal planes are slices of the data set arranged normally to the y-direction.

Each voxel in the volume data set has an associated signal value (imaging parameter). For a CT scan, the signal value for a given voxel is a measure of how much the corresponding, portion of the patient's body absorbs x-rays. The signal value may thus be referred to as radiodensity. Radiodensity is conventionally calibrated according to the Hounsfield scale. The Hounsfield scale is defined such that air has a radiodensity of −1000 HU (Hounsfield units) and water has a radiodensity of 0 HU. Typical radiodensity values for other materials are −50 HU for body fat, +40 HU for soft tissue, such as muscle, and +1000 HU for bone.

A clinician will typically analyse medial a 3-d volume data set by viewing one or more two-dimensional (2-d) images, each image corresponding to a projection of the volume data set on to a plane. The process of obtaining these 2-d images from the 3-d data set is known as rendering. The appearance of the 2-d images, e.g., view direction, and how individual voxels contribute to the final image based on their associated radiodensity, is defined by the rendering process.

A common analysis technique for virtual colonoscopy is to render a series of images to provide a virtual "fly-through" of the colon, examples of general data collection and processing methods for viewing three-dimensional patient images in this way are described in U.S. Pat. No. 5,782,762 [4] and U.S. Pat. No. 6,083,162 [5], for example. These schemes allow a user (clinician), to navigate using a computer mouse or to move automatically through the data set along the centerline of a colon lumen. As noted above, a common requirement of these methods is an ability to segment the colon so that appropriate images can be rendered.

Figure 2:
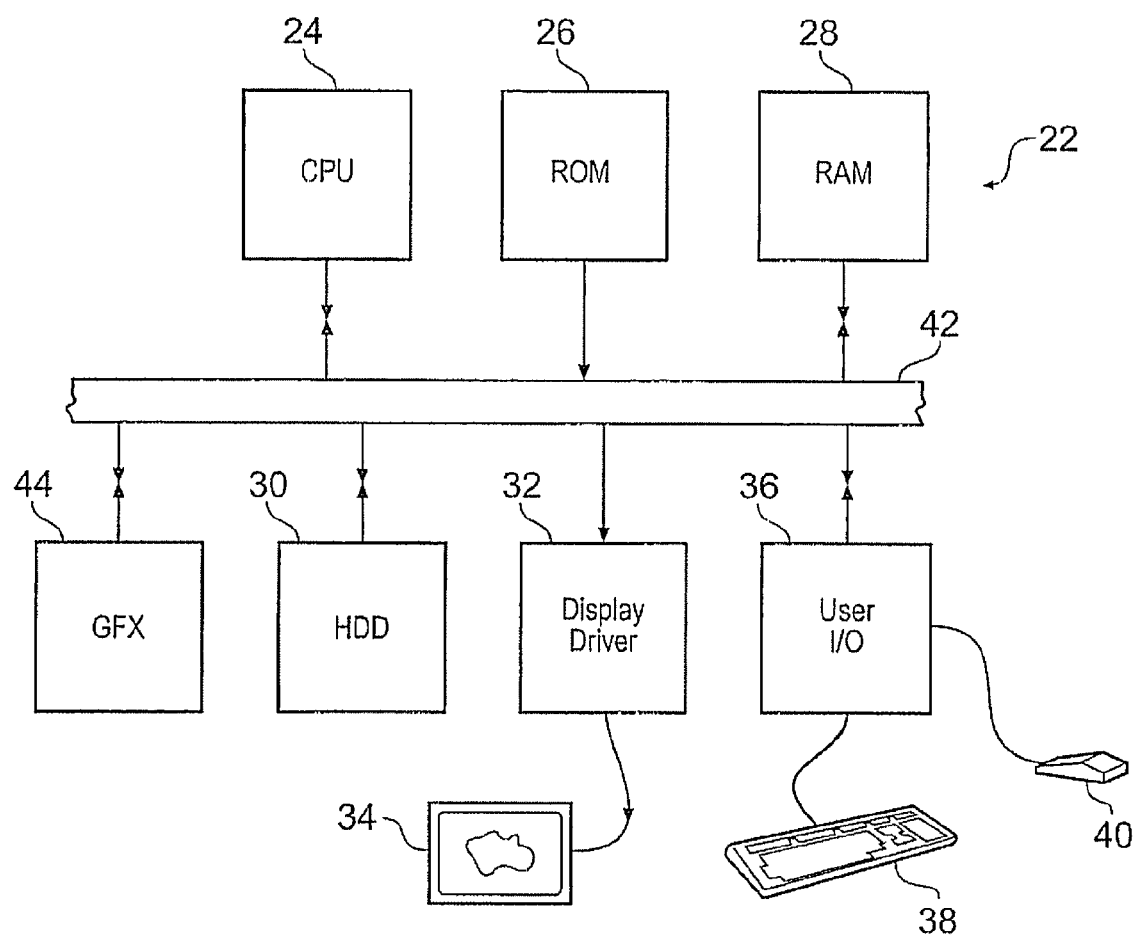
FIG. 2 schematically shows a general purpose computer system for processing volume data sets to perform colon segmentation in accordance with an embodiment of the invention.

FIG. 2 schematically illustrates a general purpose computer system 22 configured to perform processing of volume data to automatically segment a colon in accordance with an embodiment of the invention. The computer 22 includes a central processing unit (CPU) 24 a read only memory (ROM) 26, a random access memory (RAM) 28, a hard disk drive 30, a display driver 32 and display 34 and a user input/output (IO) circuit 36 with a keyboard 38 and mouse 40. These devices are connected via a common bus 42. The computer 22 also includes a graphics card 44 connected via the common bus 42. In this example, the graphics card is a Radeon X800XT visual processing unit manufactured by ATI Technologies Inc., Ontario Canada. The graphics card includes a graphics processing unit (GPU) and random access memory tightly coupled to the GPU (GPU memory) (not shown in FIG. 2).

The CPU 24 may execute program instructions stored within the ROM 26, the RAM 28 or the hard disk drive 30 to carry out processing of signal values associated with voxels of volume data that may be stored within the RAM 28 or the hard disk drive 30. The RAM 28 and hard disk drive 30 are collectively referred to as the system memory. The GPU may also execute program instructions to carry out processing of volume data passed to it from the CPU.

Figure 3:
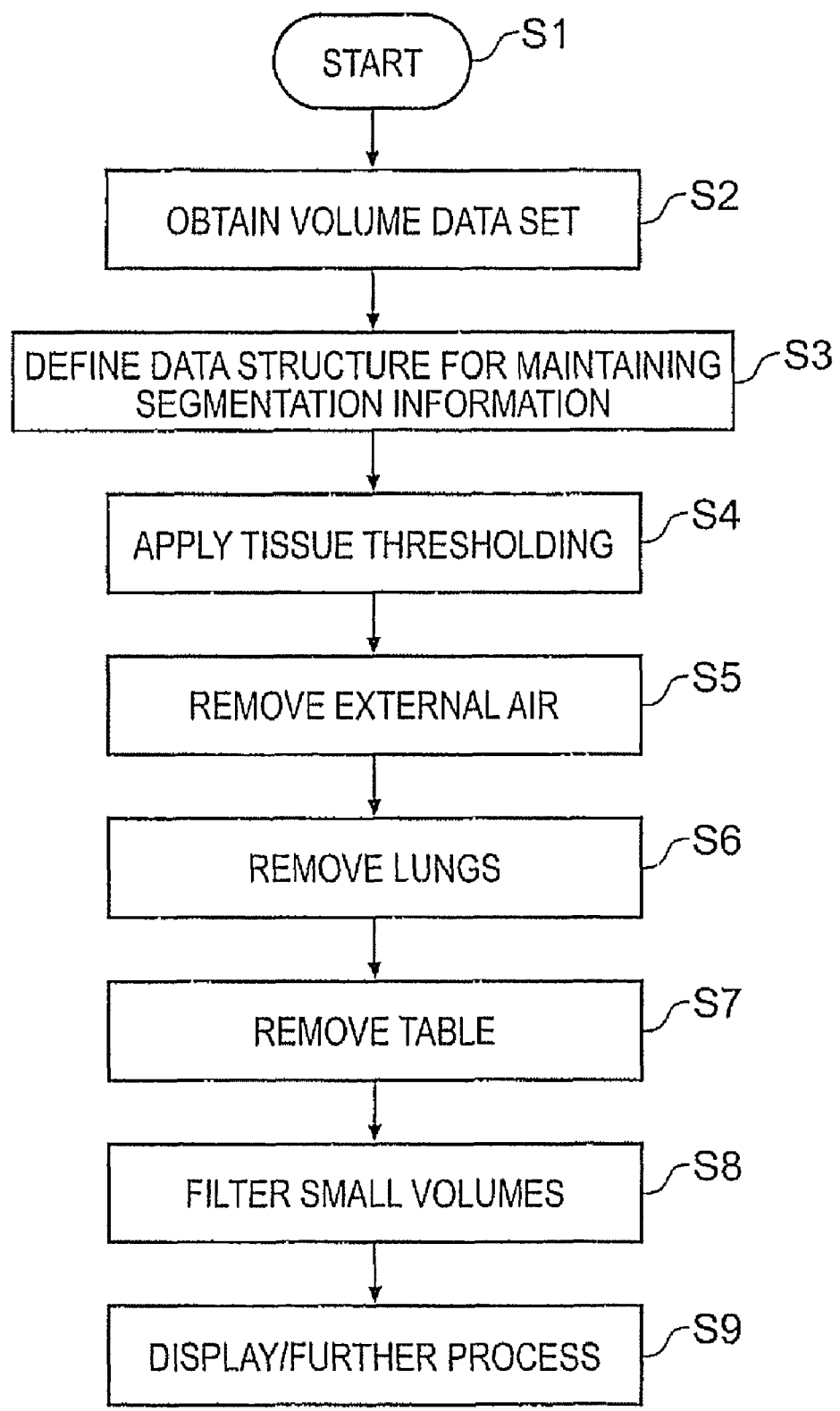
FIG. 3 schematically shows a method for automatically segmenting a colon according to an embodiment of the invention.

FIG. 3 is a flow diagram schematically showing a method of segmenting a colon according to an embodiment of the invention. The general purpose computer system 22 shown in FIG. 2 may be configured to execute the method of FIG. 3.

Processing starts at Step S1.

In step S2, a volume data set is obtained. In this example a previously recorded volume data set is retrieved from storage on the hard disk drive 30 of the computer 22. In other examples the data set may be retrieved over a network, for example a Picture Archiving and Communication System (PACS) network. Alternatively, the volume data may be obtained directly from an imaging modality, for example the CT scanner shown in FIG. 1, immediately following a scan of a patient.

Figure 4:
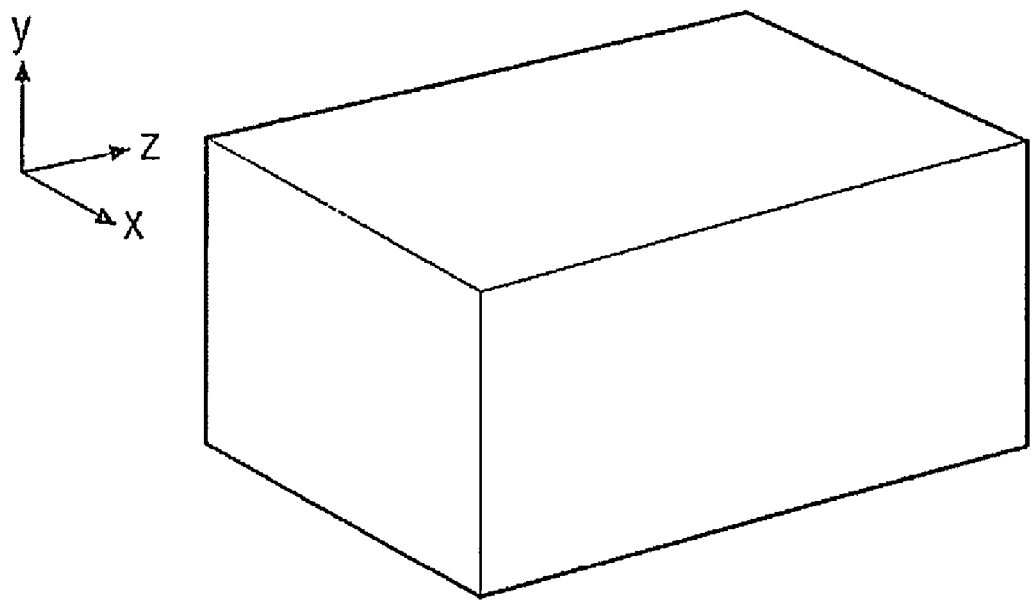
FIG. 4 schematically shows a two-dimensional image rendered from the volume data set obtained in step S2 of the method shown in FIG. 3 prior to any segmentation.

FIG. 4 schematically shows an example 2-d image rendered from the volume data set obtained in step S2. Because there has been no segmentation at this stage, all of the voxels in the volume data set contribute to the image shown in FIG. 3. Furthermore, the image is rendered in such a way that might typically be used to show an "external" view of the colon after segmentation. Thus the rendering is such that voxels associated with gas (i.e. low radiodensity in a CT scan) contribute significantly to the rendered image (because the colon will have been filled with gas during acquisition of the data). Accordingly, voxels corresponding, to the air surrounding the patient (known as external air are rendered opaque in FIG. 3 and dominate the image. Also indicated in the top left of the figure are the directions of the axes of the Cartesian coordinate system used to describe the location of voxels in the data set. In addition to this co-ordinate system, the locations of portions of the volume data set can be described by reference to the orientation of the patient, e.g. left, right, inferior (bottom), superior (top), posterior (rear) and anterior (front).

In step S3, a segmentation data structure for maintaining segmentation information is defined. The data structure may be any conventional known data structure for maintaining segmentation information. For example, the segmentation data structure may be defined as being the volume data set. Itself, wherein voxels in the data set have their associated signal values (image intensities) set to a value according to their classification in the segmentation. In another example, the data, structure may comprise a volume mask corresponding to the volume data set, wherein the volume mask contains a flag for each voxel in the volume data. The flag for each voxel can then be set during the segmentation process according to whether the classification of the corresponding voxel is within or without a volume of a given tissue-type. Thus subsequently performed data processing steps can be configured to ignore voxels, or render them transparent in an image, according to the value of the flag in the mask as appropriate. In still another example, the data structure may comprise a simple listing of which voxels are classified as the biological structure of interest, e.g. colon. The initially defined list may be empty, and thus the process of classifying a voxel as belonging to the colon involves adding it to the list, and the process of classifying a voxel as not belonging to the colon involves maintaining it off the list. In a similar manner, the list comprising the data structure for maintaining segmentation information may be initially defined to include all voxels. Thus the process of classifying a voxel as belonging to the colon involves maintaining it on the list, and the process of classifying a voxel as not belonging to the colon involves removing it from the list. A similar scheme in which the data structure comprises a list of which voxels were not classified as colon (i.e. a "negative" list) could also be used. Various other techniques are known in the art for maintaining segmentation information and any of these could equally be used.

In this embodiment, the defined data structure comprises a binary volume mask. The flag associated with voxels classified as colon are set to true (e.g. a numerical value of one). Voxels classified as not belonging to the colon have their flags set to false (e.g. a numerical value of zero). The data structure is initially defined with all flags set to true (i.e. all voxels belonging to the colon).

In step S4 a tissue threshold is applied to the volume data set. Voxels associated with radiodensity lower than the tissue threshold are taken to represent gas. Voxels with a radiodensity greater than the tissue threshold are taken to represent everything that is not gas, e.g. body tissue and solid structures within the table supporting the patient. A tissue threshold of −600 HU is used in this example. Voxels which are considered not to be associated with air can then be "removed" from the volume data, i.e. segmented out by having the associated flag values in the mask set to false/zero.

It will be understood that references to "removing" and "segmenting out" voxels from the volume data should not be seen to imply that the voxels are literally deleted from the data set. These and similar terms/phrases are used in the art to indicate that the voxels have been identified/classified as not being part of the structure of interest, e.g. colon. That is to say, for example, "removed" voxels are treated so that they do not contribute to rendered images of the segmented colon.

Figure 5:
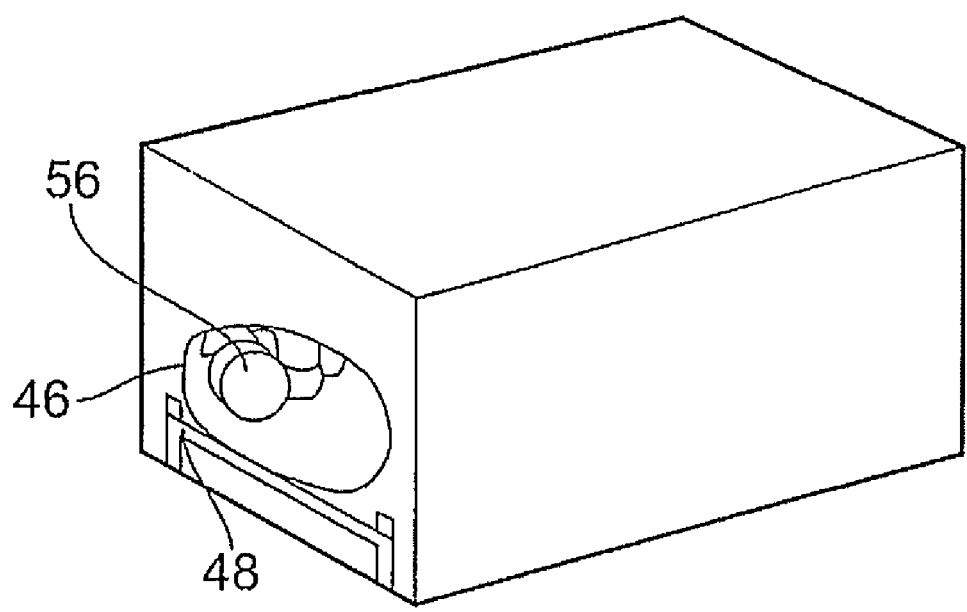
FIG. 5 schematically shows a 2-d image rendered from the volume data set after processing in accordance with step S4 of the method shown in FIG. 3.

FIG. 5 schematically shows an example 2-d image rendered from the volume data set after the threshold processing of step S4. The rendering parameters for the image shown in FIG. 5 (e.g. viewpoint etc.) correspond with those of the image shown in FIG. 4. However, since the only segmentation at this stage is the removal of voxels which have been classified as not corresponding to gas, the voxels corresponding to the external air surrounding the patient still dominate the rendered image. However, two "cavities" in the data set are apparent in the inferior transverse cross-section. A first cavity 46 corresponds with the volume occupied by the patient's body tissue has been segmented out by the processing. In step S4 and a second cavity 48 corresponds with the volume occupied by the solid portions of the support table that have also been segmented out by the thresholding step. A section of colon 50 is apparent within the first cavity 48.

In step S5, the voxels corresponding to the external air component of the volume data set are identified. To do this a 2-d transverse slice through the volume data set is considered. Conveniently, the 2-d transverse slice may correspond with the topmost slice of the volume data. Here "topmost" is taken to refer to the transverse slice nearest to the head of the patient, i.e. the most superior slice. Thus the topmost slice will be at different ends of the raw volume data set depending on whether the patient was scanned feet, or head first. Other transverse slices could also be used.

Figure 6:
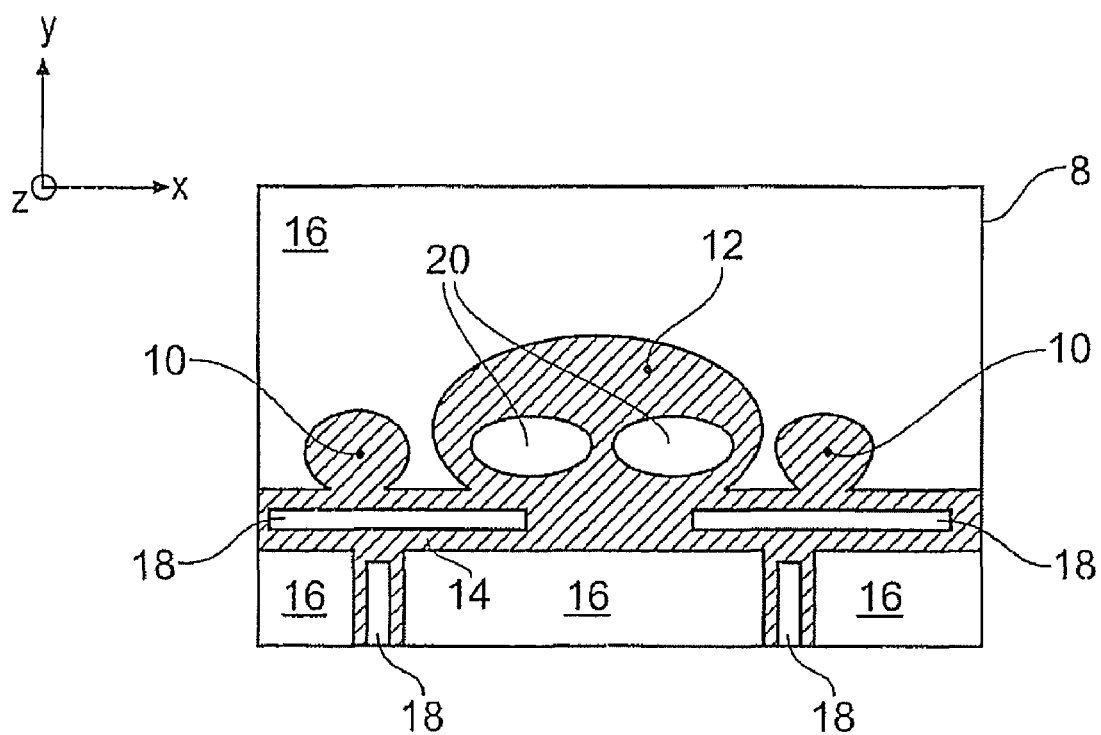
FIG. 6 schematically shows a transverse cross-section through the volume data set after processing in accordance with step S4 of the method shown in FIG. 3.

FIG. 6 schematically shows the topmost transverse slice 8 of the volume data set. The data set is represented in monochrome with voxels identified at step S4 as comprising gas shown in light colour, and voxels identified at step S4 as comprising material other than gas (and hence classified as non-colonic) shown shaded. Thus the shaded non-gas components of FIG. 6 comprise sections through the patient's arms 10, upper abdomen 12 and table structure 14. The non-shaded (gas-filled) regions comprise areas of external air 16, hollow parts 18 within the table structure, and sections through the patient's lower lungs 20. Also shown to the top left of the figure are the orientations of x- and y-axes that may be used to address the voxels within the transverse slice 8. (The z-coordinate axis is normal to the plane of the figure.)

To identify the voxels in the volume data set corresponding to external air, the transverse image slice 8 is first processed to identify connected 2-d regions (domains) comprising voxels identified as corresponding to gas in step 84. This can be done using any conventional connected-domain finding algorithm, for example a disjoint sets algorithm [7]. Thus in FIG. 6 a total often 2-d domains corresponding to gas would be identified, namely two lungs 20, four separate regions of external air 16 and four separate hollow parts 18 in the table structure. It is noted that all of the non-gas voxels are connected together in a single domain. However, there is no need to consider these regions further because they are already known not to correspond to external air by virtue of their relative high radiodensity. In any case, these regions have already been classified as non-colonic in step S4 where they were removed from the segmentation (i.e. had their corresponding flags in the mask set to false).

To identify which of the ten 2-d gas-associated regions in FIG. 6 correspond with external air, the next stage of step S5 is to determine which of the 2-d domains intersect with a sagittal or coronal boundary of the volume data set. This can easily be done, for example, by comparing the maximum and minimum y-coordinates of the voxels within a given region to determine if they corresponds with either the y-coordinate of the bottom row (i.e. the posterior coronal boundary) of the image shown in FIG. 6 (e.g., y=0), or the y-coordinate of the top row (i.e. the anterior coronal boundary) of the image (e.g., y=1023 for a volume data set having a 1024×1024 transverse cross-section). If so, this means the domain intersects with the upper or lower coronal boundary. Similarly, any domains for which, the maximum or minimum x-coordinates of the voxels within it correspond with either the x-coordinate of the left-hand column of the image shown in FIG. 6 (e.g., x=0), or x-coordinate of the right-hand column of the image (e.g., x=1023 for a volume data set having, a 1024×1024 transverse cross-section) must intersect with the volume data set at one of its sagittal boundaries.

Any domain that does intersect with the boundary of the volume data set is taken, to be made up of voxels corresponding to external air. Thus the voxels in the 3-d volume data set connected to these domains are determined, again using any conventional connected region finding algorithm, and classified as external air and so removed from the segmentation.

It most applications it will be sufficient to execute the above described stages of step S5 using only one image slice, e.g. the topmost slice. However, in cases where there might be a concern that regions of external air might not be contiguous from the topmost image slice down to other image slices, for example because the transverse section of the volume data set is narrower than the patient at his widest point, similar processing could be repeated for other image slices, e.g. the lowest most slice as well as the top most slice. However, it should be noted that in some poor quality or particularly "narrow" data sets (i.e. data sets of small transverse-extent), there is a risk that the colon may appear to intersect with a boundary of the data set. In such cases, if using slices too far down (i.e. towards the inferior end of the data set) there is a risk that the colon will be wrongly identified as external air because it appears to intersect with the boundaries of the chosen slice. Accordingly, a slice towards the superior end of the data set will in general be preferred.

It will be appreciated that which of the 2-d domains in the selected transverse slice intersect with a boundary could equally be determined by determining which of the 2-d domains are not wholly enclosed by voxels classified at step S4 as not corresponding to gas, since this would lead to the same result.

Figure 7:
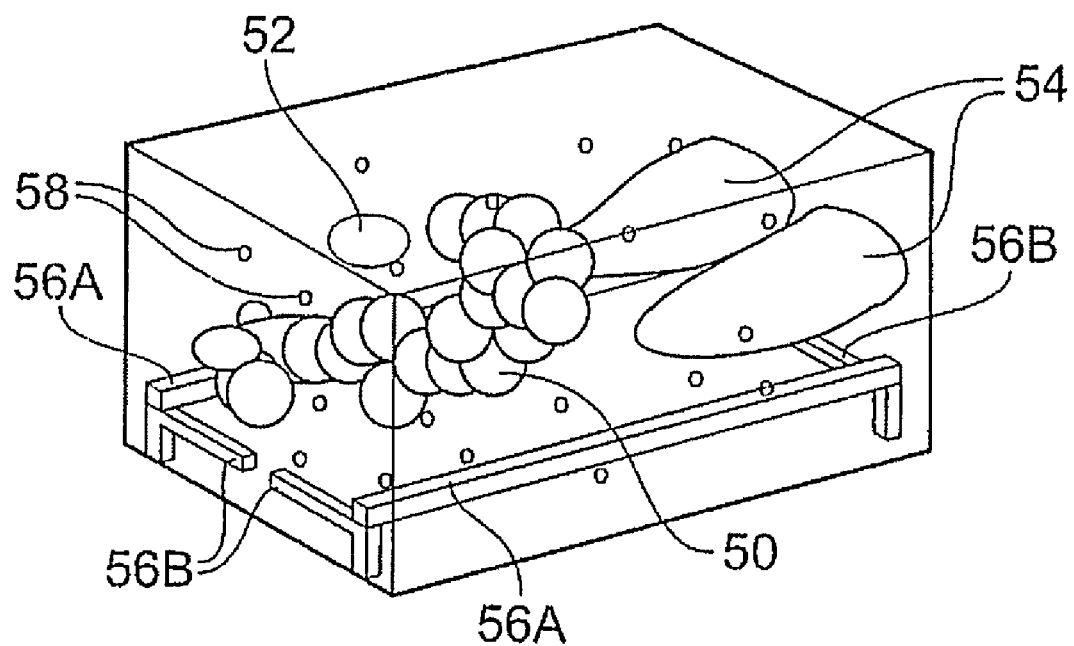
FIG. 7 schematically shows a 2-d image rendered from the volume data set after processing in accordance with step S5 of the method shown in FIG. 3.

FIG. 7 schematically shows an example 2-d image rendered from the volume data set after the external air removal processing of step S5. The rendering parameters for the image shown in FIG. 7 (e.g. viewpoint etc.) again correspond with those of the image shown in FIG. 4. Now that the external air has been removed along with the voxels corresponding to non-gas regions of the data set. FIG. 7 shows as solid the remaining gas-filled regions of the volume data set. Thus the main components apparent in the image are the colon 50, the small bowel 52, the lower portions of the patient's lungs 54 and hollow parts 56A, 56B in the table structure (e.g. conducts in tubular steel). In this example, the hollow parts in the table structure comprise some hollow parts 56A which run along the transverse extent of the volume data set (e.g. associated with side rails), and some hollow parts 568 which are confined to one or other end of the volume data set. In addition, a number of relatively small groupings of voxels 58, generally comprising less than 100 voxels, will remain in a typical image. These small groupings of voxels 58 correspond to features such as gas-filled pockets in the clothes or body of the patient.

In step S6 of the processing shown in FIG. 3, voxels corresponding to the patient's lugs are identified. To do this, two 2-d transverse slices through the volume data set are considered. Conveniently, one of the 2-d transverse slices may correspond with the topmost slice of the volume data already considered in step S5. The second of the two 2-d transverse slices may be a slice toward an approximately midway position through the volume data set.

To identify the voxels in the volume data set corresponding to the lungs, the upper (i.e. most superior) one of the two transverse image slices is processed to identify connected 2-d domains which comprise voxels identified as gas in step S4, but which have not been identified as external gas in step S5. Thus this processing stage is broadly similar to the first processing stage of step S5. Accordingly, if the same topmost slice is considered in both steps S5 and S6, there is no need to repeat the connected-domain finding algorithm again, instead the results of the corresponding processing in step S5 can be used with the previously identified 2-d domains subsequently identified as external air discounted. Thus, referring again to FIG. 6, a total of six 2-d domains corresponding to gas would be identified in toe topmost slice at this stage. Namely the two lungs 20 and the four separate hollow parts 18 in the table structure.

To identify which of these six 2-d gas-associated regions correspond with the lungs, the next stage of step S6 is to determine which voxels in the 3-d volume, data set are connected to the 2-d domains identified in the topmost slice. This can again be done using any conventional connected region finding algorithm. The next stage is to identify which of these six 3-d domains intersect with toe transverse slice midway through the volume data set and which do not. This can easily be done by determining whether the z-coordinate of any of the voxels within one of the 3-d connected regions (domains) corresponds with the z-coordinate of toe slice selected midway or so through the volume data set. If so, the 3-d domain intersects with the slice midway through the volume data set. If not, the 3-d domain does not intersect with the slice midway through the volume data set.

Any 3-d connected domain that intersects with the topmost transverse slice but does not intersect with the other transverse slice positioned approximately midway through the volume data set is taken to be made up of voxels corresponding to lung. Thus the voxels within these 3-d connected domains are classified as lungs and so removed from the segmentation (have their flags in the mask, set to false).

It will be appreciated that although step S6 has been discussed in terms of being primarily aimed at segmenting out the patient's lungs, other non-lung components of the volume data may also be segmented out at this stage. For example, the table structure's hollow parts 56B confined to the superior end of the data set in this case are taken here to intersect with the topmost slice. Accordingly, these hollow parts will also be classified as lung by the processing in step S6 (because these hollows do not extend as far as the centre of the volume data set). However, this misclassification does not matter. This is because it is not significant how non-colonic voxels (i.e., voxels identified as not belonging to the colon) are classified. The aim of colon segmentation is to classify voxels as either belonging to the colon (and hence to be maintained in the segmentation), or not (and hence to be removed/segmented out/rendered transparent in any images). Thus all that is significant is that colonic and non-colonic voxels are distinguished, and not that the non-colonic voxels are further classified correctly.

Figure 8:
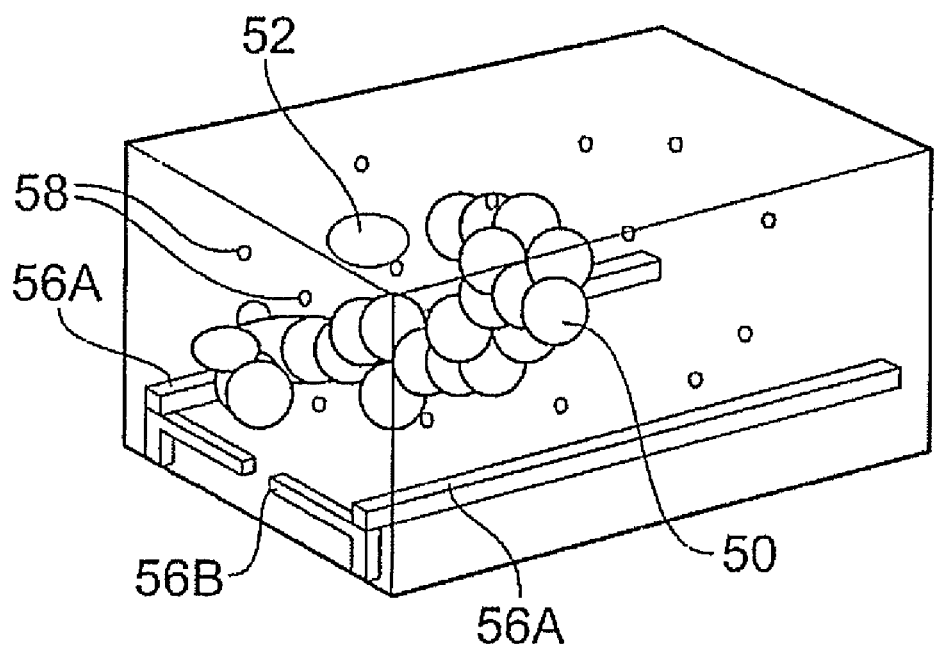
FIG. 8 schematically shows a 2-d image rendered from the volume data set after processing in accordance with step S6 of the method shown in FIG. 3.

FIG. 8 schematically shows an example 2-d image rendered from the volume data set after the lung removal processing of step S6. The rendering parameters for the image shown in FIG. 8 (e.g. viewpoint etc.) again correspond with those of the image shown in FIG. 4. The main components apparent in the image are the colon 50, the small bowel 52, the relatively small groupings of voxels 58, the table structure's hollow parts 56A running along the transverse extent of the data set, and the table structure's hollow parts 56B confined to the inferior end of the volume data set. FIG. 8 thus differs from FIG. 7 in that the patient's lungs and the table structure's hollow parts 568 confined to the superior end of the volume data set are not displayed, having being segmented out by the processing in step S6.

In step S7 the remaining hollow parts of the table structure, (e.g. the hollow parts 56A running along the transverse extent of the data set and the hollow parts 56B confined to the inferior end of the data set) are removed. This is done by first identifying a sub-portion of the volume data set considered most likely to include the table structure (or other structural features associated with the scanner).

The choice of sub-portion will thus depend on the orientation of the patient on the table during the scan the relationship with the orientation of the volume data set. In a typical scan, the patient will be lying flat on their back on the support table (supine), and so the table will be located to the posterior of the patient and with the plane of the table surface extending primarily in a coronal plane. In other scans the patient may be lying on their front (prone). In these cases the table will be located to the anterior of the patient, with the plane of the table surface again extending primarily in a coronal plane. If the patient were lying on their left-hand side during the scan, the table will be located to the left of the patient in the data set, and the plane of the table surface will extend primarily in a sagittal plane. If the patient were lying on their right-hand side during the scan, the table will be located to the right of the patient in the data set, and the plane of the table surface will again extend primarily in a sagittal plane.

In this example, the patient is lying on their back, and so the sub-portion considered most likely to include the table structure is to their posterior. The sub-portion is taken to comprise the voxels in a slab of coronal slices starting at the most-posterior coronal slice (i.e. the bottom "surface" of the volume data set in the orientation shown in FIG. 8) and extending up through one-quarter of the volume data set. This 25% sub-portion of the data set is analysed to identify any connected 3-d domains which occur wholly within it. The voxels in any such domains are taken to correspond with the table structure and are removed from the segmentation.

A fraction of around one-quarter or so of the volume data set is appropriate since this will normally include the table in most typical patient scan configurations. However, it will be understood that other values, e.g. between 20% or 30%, could also be used. The most appropriate amount for a given implementation will depend on the characteristics of the scan being analysed.

Figure 9:
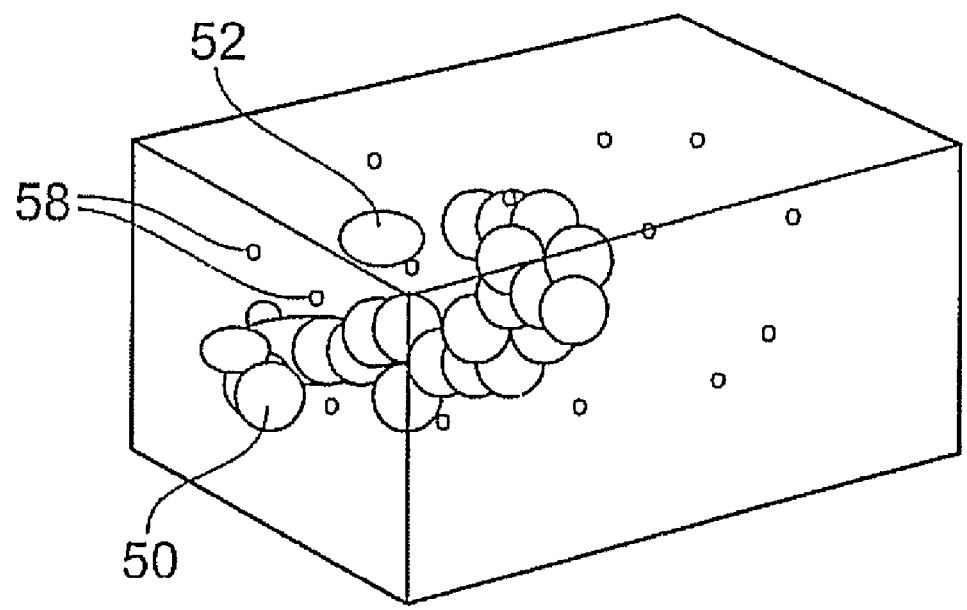
FIG. 9 schematically shows a 2-d image rendered from the volume data set after processing in accordance with step S7 of the method shown in FIG. 3.

FIG. 9 schematically shows an example 2-d image rendered from the volume data set after the table removal processing of step 87. The rendering parameters for the image shown in FIG. 9 are again the same as those of previous figures. The main components apparent in the image are the colon 50, the small bowel 52 and those of the relatively small groupings of voxels 58 that are present in the upper 75% of the volume data set (for the orientation shown in the figure). FIG. 9 thus differs from FIG. 8 in that the previously apparent table structure's hollow parts 56A running along the transverse extent of the data set and hollow parts 56B confined to the inferior end of the data set, as well as the small groups 58 of voxels in the lower 25% of the volume data set, are not displayed, having being segmented out by the processing in step S7.

In step 58, a spatial filter is applied to the volume data set to identify and segment out all connected regions having volumes less than a threshold number of voxels. This is to remove any remaining ones of the small groupings of voxels 58 seen in FIGS. 7, 8 and 9. A suitable threshold number might be on the order of 100 voxels or so. However the threshold number will in general be chosen according to the expected characteristics of a typical data set. For example, in a high resolution volume data set the small groupings of voxels 58 shown in FIG. 9 will in general be made up of more voxels than in a relatively low resolution volume data set.

FIG. 9 schematically shows an example 2-d image rendered from the volume data set after the removal of the small groupings of voxels 58 in step S8. The rendering parameters for the image shown in FIG. 9 are again the same as those of previous figures. The only remaining components apparent in the image are the colon 50 and the small bowel 52. In general the presence of the small bowel in a colon segmentation is not a distraction for the clinician since it is readily identifiable and does not significantly impact the way-in which the colon appears when viewed, or affect any further processing stages. Accordingly in this example there is no attempt made to segment out the small bowel. Thus so far the colon segmentation method shown in FIG. 3 is concerned, the small bowel is assumed to belong to the colon. If, however, removal of the small bowel from the final segmentation is desired, an additional processing step could be performed to remove it.

Figure 10:
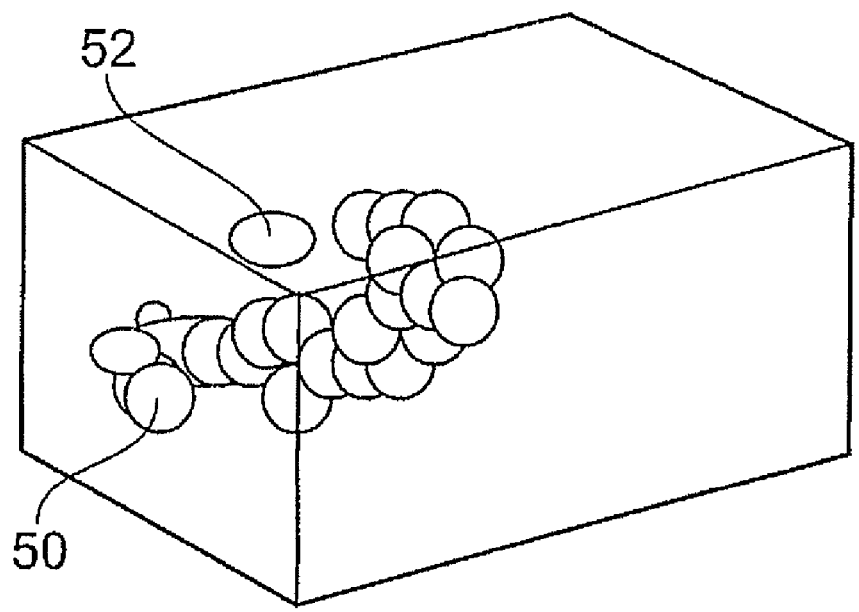
FIG. 10 schematically shows a 2-d image rendered from the volume data set after processing is accordance with step S8 of the method shown in FIG. 3.

Thus FIG. 10 is a graphical representation of the complete segmentation of the colon in accordance with the method shown in FIG. 3. Accordingly, in a final step S9 of the method shown in FIG. 3, the segmented volume data set is displayed to a user (e.g. as shown in FIG. 10), or is otherwise further processed in accordance with the application at hand. For example, the segmented volume data set may be further processed to generate a series of images corresponding to a video (cine) view around the colon. Alternatively, a series of virtual colonoscopy images corresponding to a fly-through of the colon may be rendered and displayed in sequence. This will typically involve a step of identifying the voxels in the segmented colon which are associated with the surface of the segmented volume comprising the colon (or the multiple segmented volumes comprising the colon in the ease that the colon is obstructed and so appears as multiple segments) and rendering images of these voxels from a view point that moves along within the virtual colon. These techniques for performing virtual colonoscopy once the colon has been segmented are well known in the art.

Figure 11:
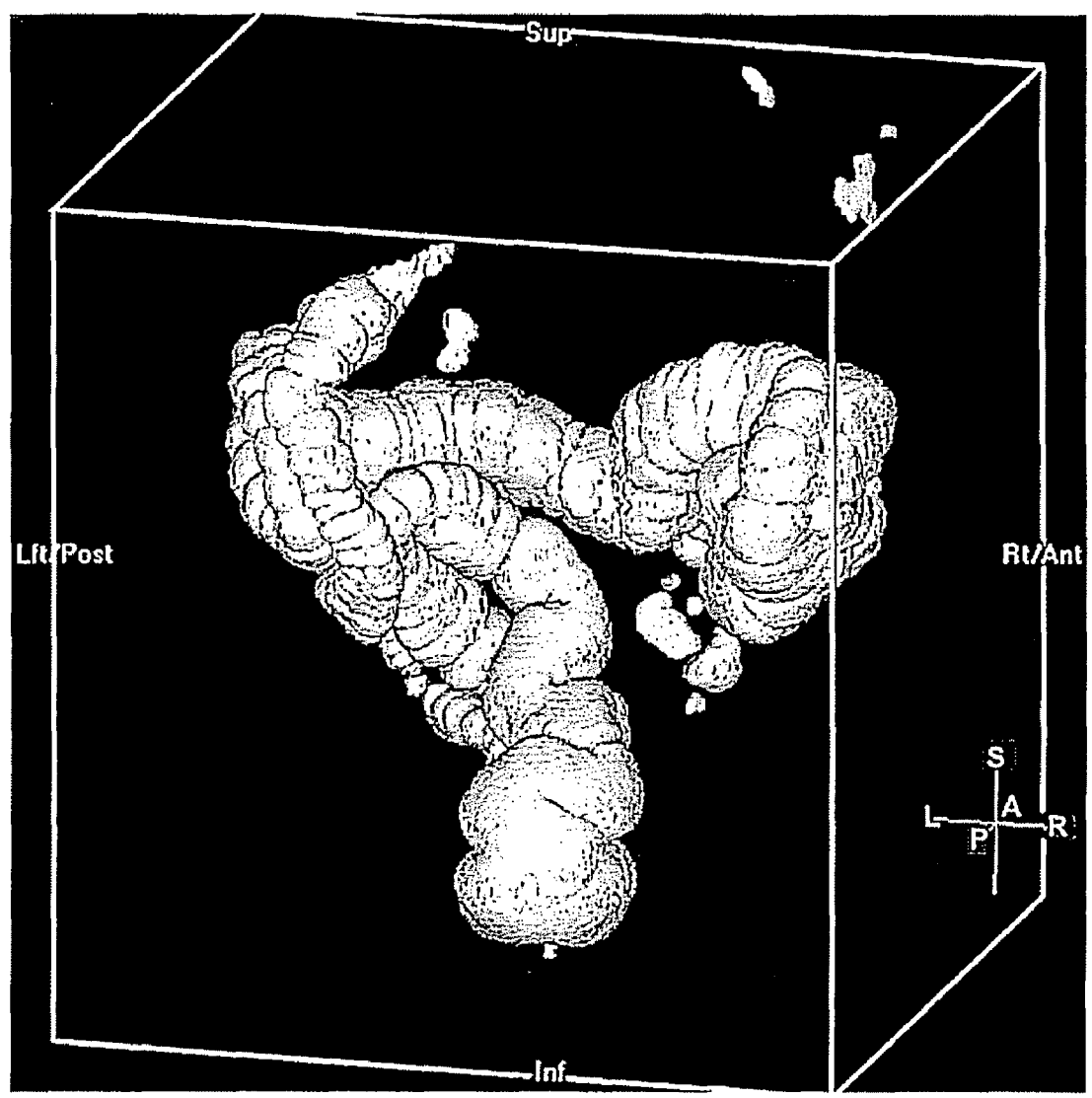
FIG. 11 schematically shows a 2-d image of a colon segmented according to an embodiment of the invention.

FIG. 11 is similar FIG. 10 but shows a graphical representation of the complete segmentation of a colon in accordance with the method shown in FIG. 3 using "real" medical data. It is clear that even though the colon is a complex wound structure, it is has been clearly segmented with only a small number of other artifacts appearing in the image (e.g. the small volumes to the top right of the image). This clearly demonstrates the ability of the method to accurately segment the colon.

Thus to summarise the above described processing, a method of automatically segmenting a patient's colon in a medical image data set has been described. The method can be considered to comprise two main stages. A first stage involves classifying voxels in the data set as not belonging to the colon based on their radiodensities and/or positions within the volume data set. In taking account of the voxels' positions in the data set, account may be taken of their absolute positions, or the positions relative to other voxels. For example, this may include determining whether voxels are within connected groups of voxels of similar characteristics, i.e. within connected regions or domains. Subsequent to the first stage of classifying voxels as not belonging to the colon, a second stage is performed in which all remaining voxels are classified as belonging to the colon. Thus the method allows for automatic segmentation of the colon without needing any particular voxel, such as a seed voxel for region growing, to first be positively identified as being within the colon.

It will be appreciated that not all of the specific processing steps described above and shown in FIG. 3 are necessary for all embodiments of the invention. For example, in cases where the volume data set is known to be fully enclosed within the extent of the patient's body, there would be no need to perform step S5 because it would be known there was no external air in the volume date set. Furthermore the steps need not all be performed in the order shown or performed in the same way described above. For example, rather than use the topmost transverse slice in steps S5 and S6, a slice a little further into the volume data set may be used wife negligible effects on the results. For example this may be done to avoid any potential detrimental edge effects associated with the outermost layers of voxels.

Nonetheless, regardless of the specific details of the processing employed, the same general principle remains. Namely seeking to identify which voxels in the data set do not belong to the colon in view of their radiodensity and/or position in the volume data set (where position includes their spatial relationship, e.g. connectivity, with other voxels), and taking the remaining voxels in the data set as corresponding to the segmented colon. Accordingly the method avoids the need to positively identify one or more voxels within the colon to allow it to be segmented.

This above-described approach has the advantage of being a conservative technique which is nonetheless robust and reliable. The technique is conservative because where there is increased scope for errors in the segmentation, for example due to a badly collapsed colon, the method is more likely to lead to non-colonic voxels being assumed to belong to the colon, rather than have voxels which do belong to the colon being removed from the segmentation. This reduces the risk of a potentially important section of colon, e.g. one containing a polyp, being overlooked by the clinician because it was incorrectly excluded from the segmentation.

Furthermore, because the method employs only relatively simple processing steps which are well known in the field of medical imaging, and for which efficient algorithms have been developed (e.g., connected region finding etc.), the process is relatively fast. For example, experiments have shown that the colon in a typical medical image data set can be automatically segmented in a couple of seconds with only a moderately powerful general purpose computer, for example a dual Xeon 2.8 GHz workstation. This represents an improvement on the order of a factor of ten in speed over, for example, the automatic colon segmentation method described by Frimmel et al. [4], and an improvement on the order of a factor of close to 2000 over the automatic colon segmentation method described by Wyatt et al. [3].

In addition to their use in automatic colon segmentation, it will be appreciated that some of the above described steps can also be useful in segmenting medical images for purposes other than colon segmentation.

For example, the process of table removal may be useful in many different circumstances where medical image volume data are to be analysed regardless of the nature of the particular study at hand. In some, if not most, of such cases, the analysis will not be focussed primarily on voxels containing gas. Accordingly, there will not be an initial tissue thresholding operation similar to that described above in relation to step S4 that would remove the solid parts of the table structure. Thus the process of removing all connected, regions in a specified sub-portion of the volume data set (i.e. the sub-portion considered most likely to include the table structure) can be used to identify and segment out the solid portions of the table, as well as the hollow portions which remain prior to step 57 in the above described colon segmentation method.

While the above description has referred to data from a CT scanner, it will be appreciated that the data could equal be obtained from other imaging modalities, for example a magnetic resonance imaging (MRI), positron emission tomography (PET), or ultrasound scanner. It will be appreciated that data from different imaging modalities are generally differently calibrated and are sensitive to different physical parameters of the patient. Thus, for example, instead of applying a radiodensity threshold of around −600 HU for removing non-gas voxels (such as described above in connection with step S4 of the method shown in FIG. 3), a different thresholding will be appropriate for different imaging modalities. The thresholding will be based on the typical imaging signal for the scanner for air compared to the typical imaging signal for the scanner for other material.

For use in a hospital environment, a computer system that implements the invention may usefully be integrated with a Picture Archiving and Communication System (PACS). This is a hospital-based computerised system which can store diagnostic images of different types (including three-dimensional volume data sets from CT, MRI, PET and ultrasound) in a digital format organised in a single central archive. Each image has associated patient information such, as the name and date of birth of the patient also stored in the archive. The archive is connected to a computer network provided with a number of workstations, so that users all around the hospital site can access and view any image data as needed. Additionally, users remote from the site may be permitted to access the archive over the internet or a wide area network.

In the context of the present invention, therefore, a plurality of volume data sets can be stored in a PACS archive, and a computer-implemented method of segmenting a colon according to of embodiments of the invention can be provided on a workstation connected to the archive via a computer network. The segmentation may be performed on a local processor comprised within, the workstation, or on a central processor located elsewhere in the network.

Figure 12:
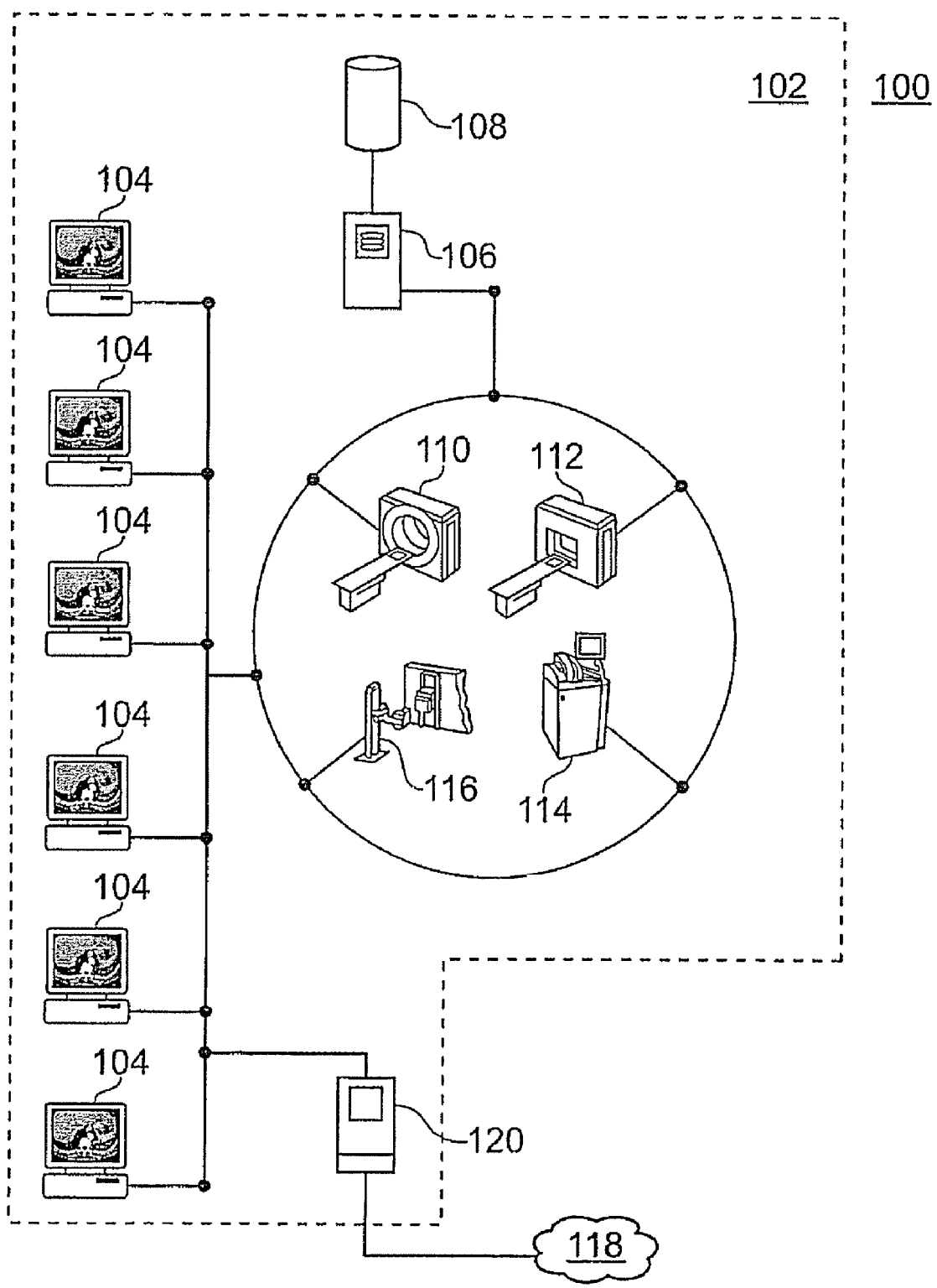
FIG. 12 shows an example computer network that can be used in conjunction with embodiments of the invention.

FIG. 12 shows an example computer network which can be used in conjunction with embodiments of the invention. The network 100 comprises a local area network in a hospital 102. The hospital 102 is equipped with a number of workstations 104 which each have access, via the local area network, to a hospital computer server 106 having an associated storage device (memory) 108. A PACS archive is stored on the storage device 108 so that data in the archive can be accessed from any of the workstations 104. One or more of the workstations 104 has access to software for computer-implementation of methods of segmentation as described above. The software may be stored locally at the or each workstation 104, or may be stored remotely and downloaded over the network 100 to a workstation 104 when needed. In another example, methods embodying the invention may be executed on the computer server 106 with the workstations 104 operating as terminals. A number of medical imaging devices 110, 112, 114, 116 are connected to the hospital computer server 106. Volume data collected with the devices 110, 112, 114, 116 can be stored directly into the PACS archive on the storage device 106. Thus segmented data set may be automatically generated immediately after the corresponding volume data set is recorded, so that swift further processing/viewing to allow rapid diagnosis can be performed in the event of a medical emergency. The local area network 100 is connected to the Internet 118 by a hospital internet server 120, which allows remote access to the PACS archive. This is of use for remote accessing of the data and for transferring data between hospitals, for example, if a patient is moved or to allow external research to be undertaken.

It will be appreciated that although particular embodiments of the invention have been described, many modifications/additions and/or substitutions may be made within the scope of the present invention. Accordingly, the particular examples described are intended to be illustrative only, and not limitative.

REFERENCES

[1] Gonzalez, R. C, Woods, R. E., Digital Image Processing, Reading, Mass.: Addison-Wesley, 1993
[2] Haraliek, R. M., Shapiro, L. G., Computer and Robot Vision, Reading, Mass.: Addison-Wesley, 1993
[3] Wyatt, C. L., Ge, Y., Vining, D. J., Automatic Segmentation of the Colon for Virtual Colonoscopy, Computerized Medical Imaging and Graphics, 24, 1, 1-9, 2000.
[4] Frimniel, H., Nappi. J., Yoshida, H., Centerline-based Colon Segmentation for CT Colonography, Medical Physics, 32, 8, 2665-2672, August 2005
[5] U.S. Pat. No. 5,782,762 (Wake Forest University)
[6] U.S. Pat. No. 6,083,162 (Wake Forest University)

[7] Cormen, T. H., Leiserson, C. B. Rivest, R. L., Stein, C, Introduction to Algorithms, Second Edition. MIT Press and McGraw-Hill, ISBN 0-262-03293-7. Chapter 21: Data structures for Disjoint Sets, pp. 498-524, 2001

What is claimed is:

1. A method of segmenting a colon in a medical image volume data set comprising an array of voxels having associated signal values, the method comprising:
defining a segmentation data structure for maintaining segmentation information; and
classifying voxels in the segmentation data structure by performing a first step of classifying voxels as not belonging to the colon based on their associated signal value and/or position in the data set, and performing a second step of classifying remaining voxels as belonging to the colon, thereby automatically segmenting the colon without first requiring a voxel to be identified within it.

2. A method of segmenting a colon according to claim 1, wherein the first step includes classifying voxels having signal values greater than an intensity threshold as not belonging to the colon.

3. A method of segmenting a colon according to claim 2, wherein the intensity threshold is selected from the group consisting of −200, −300, −400, −500, −600, −700 and −800 Hounsfield Units.

4. A method of segmenting a colon according to claim 1, wherein the first step includes classifying voxels with a position within a connected region of voxels contained wholly within a pre-determined sub-portion of the data set as not belonging to the colon.

5. A method of segmenting a colon according to claim 4, wherein the sub-portion comprises a region of the data set extending away from the posterior coronal boundary of the data set.

6. A method of segmenting a colon according to claim 4, wherein the sub-portion comprises a fraction of selected from the group consisting of 10%, 15%, 20%, 25%, 30%, 35%, 40%, 45% and 50% of the voxels in the medical image data set.

7. A method of segmenting a colon according to claim 1, wherein the first step includes classifying voxels in connected regions which intersect with the sagittal and coronal boundaries of the data set as not belonging to the colon.

8. A method of segmenting a colon according to claim 1, wherein the first step includes selecting first and second transverse planes in the volume data set and classifying voxels in connected regions which intersect with the first transverse plane but not with the second transverse plane as not belonging to the colon.

9. A method of segmenting a colon according to claim 1, wherein the first step includes classifying voxels in connected regions having a volume less than a threshold number of voxels as not belonging to the colon.

10. A method of segmenting a colon according to claim 9, wherein the threshold number of voxels is selected from the group consisting of 50, 100, 150, 200, 250 and 300 voxels.

11. A method of segmenting a colon according to claim 1, further comprising displaying an image which represents the segmented colon to a user based on the contents of the segmentation data structure.

12. A non-transitory computer readable storage medium with an executable program stored thereon, wherein the program instructs a processor to perform the method of claim 1.

13. A system for segmenting a colon in a medical image volume data set comprising an array of voxels having associated signal values, the system comprising:
a processor and memory; and
logic stored in memory and executable by the processor, said logic including logic that defines a segmentation data structure for maintaining segmentation information, and
logic that classifies voxels in the segmentation data structure by performing a first step of classifying voxels as not belonging to the colon based on their associated signal value and/or position in the data set, and performing a second step of classifying remaining voxels as belonging to the colon, thereby automatically segmenting the colon without first requiring a voxel to be identified within it.

14. The system according to claim 13, further comprising a computer network.

15. An apparatus for segmenting a colon in a medical image data set comprising an array of voxels having associated signal values, the apparatus comprising:
a processing unit coupled to a source of medical image data, wherein the processing unit is operable to load a medical image data set from the source of medical image data, and further operable to define a segmentation data structure for maintaining segmentation information; and
classify voxels in the segmentation data structure by performing a first step of classifying voxels as not belonging to the colon based on their associated signal value and/or position in the data set, and performing a second step of classifying remaining voxels as belonging to the colon, thereby automatically segmenting the colon without first requiring a voxel to be identified within it.

* * * * *